United States Patent

[11] 3,602,044

[72] Inventor Francis J. Markey
  Lewisburg, Ohio
[21] Appl. No. 36,870
[22] Filed May 13, 1970
[45] Patented Aug. 31, 1971
[73] Assignee General Motors Corporation
  Detroit, Mich.

[54] PEDAL TEST INSTRUMENT
  3 Claims, 3 Drawing Figs.
[52] U.S. Cl. .................................................. 73/132,
  73/139
[51] Int. Cl. .................................................... G01l 5/22
[50] Field of Search ........................................... 73/132,
  139, 144

[56] References Cited
  UNITED STATES PATENTS
1,848,488 3/1932 Lindendoll .................. 73/132 X
2,337,546 12/1943 Cox ............................. 73/139
2,872,808 2/1959 Ney et al. .................... 73/144

Primary Examiner—Jerry W. Myracle
Attorneys—W. E. Finken and D. D. McGraw

ABSTRACT: A brake system test instrument which measures the force applied to the brake pedal upon actuation of the brake pedal through a specified arcuate displacement. The test instrument is attached to the brake pedal and brake applying force is applied to the handle of the test instrument causing the brake pedal to rotate about its pivot point. A spirit level device indicates the arcuate displacement of the pedal and a hydraulic pressure cell and gauge provides a means of measuring the force applied to the pedal.

PATENTED AUG 31 1971 3,602,044

INVENTOR.
Francis J. Markey
BY
D. D. McGraw
ATTORNEY

PEDAL TEST INSTRUMENT

The invention relates to a mechanism for inspecting pedal actuated systems, and more particularly pedal actuated motor vehicle brake systems. It is known that a properly functioning brake system requires, within limits, a specified pedal force to actuate the brake system. One method of verifying the operational integrity of the vehicle brake system is to determine the limits of force which must be applied to the pedal to actuate the brake pedal through a specified arc, and to test the vehicle system for conformance to these standards. It is desirable therefore, to provide a pedal test instrument which will provide for the actuation of the brake pedal through a specified arcuate displacement and provide a means of measuring the force applied. The test instrument may also be used for inspecting other pedal actuated systems having similar parameters. However, further description of the tool will be related to a vehicle brake system.

The present invention comprises a pedal test instrument in which a hand operated lever is used to actuate the brake pedal. A yoke attached to the lever engages the brake pedal lever between the pedal lever pivot point and the pedal. A hydraulic pressure cell is mounted upon the lever and engages the brake pedal. A hydraulic pressure gauge is connected to the hydraulic pressure cell and is calibrated to provide a direct reading of the force applied to the brake pedal. Application of force to the hand grip of the test instrument lever causes the brake pedal lever to rotate arcuately about its pivot point. Pressure is generated in the hydraulic pressure cell in proportion to the force applied to the brake pedal.

Two spirit level devices are fixed relative to each other at an angle corresponding to the angle through which the pedal is to be rotated during the test. The spirit level assembly is pivotally attached to the lever so that after the test instrument is attached to the pedal, the spirit level assembly is rotated in relation to the lever until the lower spirit level assumes a level horizontal position. Pedal actuating force is then applied until the upper spirit level assumes the level horizontal position thereby indicating that the brake pedal has been rotated through the specified arcuate displacement. The test operator then reads the pressure gauge and compares the force required to move the pedal through the specified arcuate displacement with the test standard for the particular pedal actuated system which is being tested.

Figure 1:
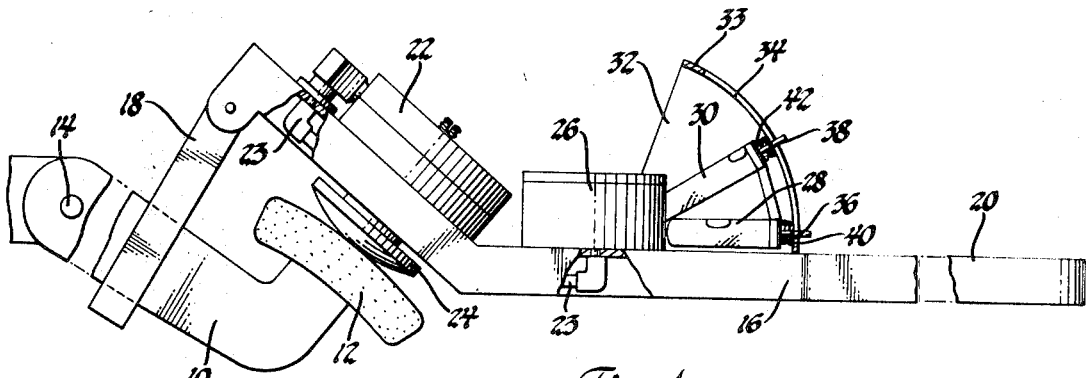
FIG. 1 is a side elevation of the pedal test instrument attached to the vehicle pedal.
Figure 2:
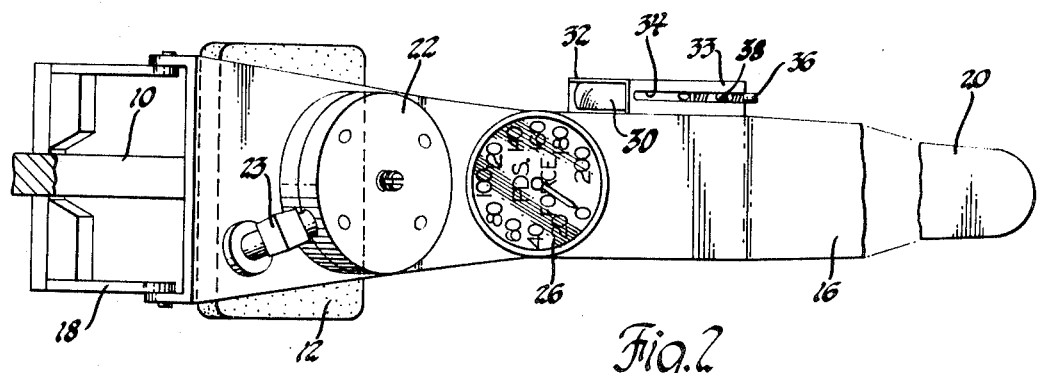
FIG. 2 is a plan view of the pedal test instrument of FIG. 1.

Pedal lever 10 and pedal 12 provide the means of actuation for a vehicle brake system or other pedal operated system.

Application of force to the pedal 12 causes the pedal lever 10 to rotate about pivot 14 actuating the brake system through a linkage which is not shown. Test instrument lever 16 is the frame member of the test instrument. Yoke 18 is pivotally attached to test instrument lever 16 and formed to slip over the pedal 12 and engage the pedal lever 10. A hand grip 20 is formed on the end of test instrument lever 16. Pressure cell 22 is mounted upon test instrument lever 16 and pressure cell head 24 engages the pedal 12. Pressure gauge 26 communicates with pressure cell 22 through conduit 23. Upon application of brake applying force to the hand grip 20, yoke 18 provides a reaction force causing force to be applied to pedal 12 through pressure cell head 24. Pressure is generated in pressure cell 22 equal to the force applied to pedal 12. Pressure gauge 26 provides a reading of the force applied.

Spirit levels 28 and 30 are fixed to each other at an angle corresponding to the arcuate angle through which brake pedal lever 10 is to be moved for comparison with the test standards.

Figure 3:
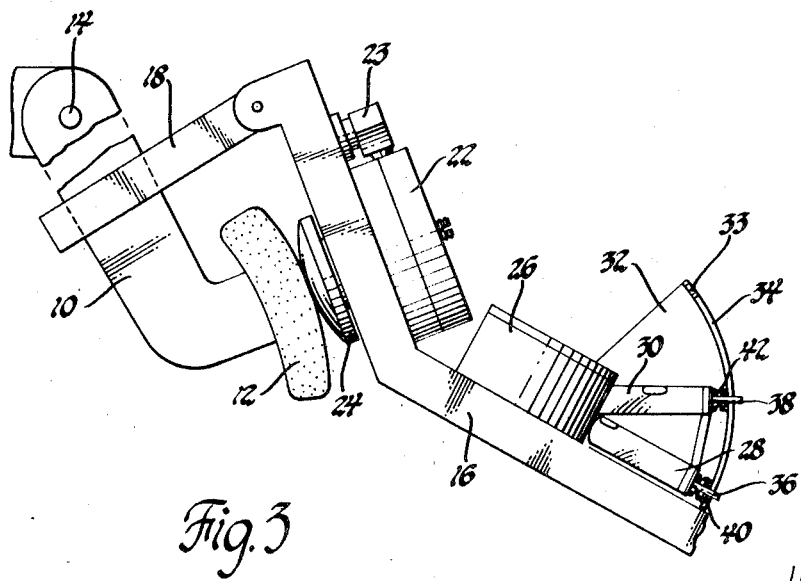
FIG. 3 is a side elevation of the pedal test instrument and vehicle pedal of FIG. 1 showing the test instrument in the fully applied position.

The attachment of spirit level 28 to spirit level 30 may be adjustable to allow the test instrument to be adapted to a wide variety of pedal actuated system. The spirit levels 28 and 30 are pivotally attached to housing 32. Housing 32 has an arcuate guide 33 in which guide slot 34 is formed to receive guide rods 36 and 38. Guide rods 36 and 38 extend axially from spirit levels 28 and 30, and through guide slot 34. Springs 40 and 42 encircle guide rods 36 and 38 and are seated against spirit levels 28 and 30, and act against the arcuate guide 33 to form a friction detent. When the test instrument is attached to the brake pedal, the test operator grips guide rod 36 or 38 and, by applying sufficient force to overcome the friction between springs 40 and 42 and arcuate guide 33, rotates the spirit levels 28 and 30 until spirit level 28 assumes a level horizontal position as shown in FIG. 1. The level horizontal position is indicated, depending upon the construction of the spirit level, when the air bubble settles at the center or end of the spirit level. The test operator then applies increasing force to hand grip 20 until the movement of the test instrument lever 16 with pedal lever 10 brings the spirits level 30 to the level horizontal position, as shown in FIG. 3, indicating that the pedal lever 10 has been moved through an arcuate path equal to the angle between the spirit levels 28 and 30. The operator then reads the pressure gauge 26 and compares the force applied to move the pedal lever through the specified arc with the test specification for that particular pedal system. Alternative means of angular measurement indication, such as substitution or a lamp or buzzer signal actuated by mercury switches, can be provided.

Thus a portable, manually operable test instrument is provided for vehicle brake systems and other pedal actuated systems having similar parameters.

What is claimed is:

1. A test instrument for pedal actuated systems comprising:
   a test instrument lever having a yoke pivotally attached to one end thereof, said yoke formed to engage the pedal lever to effectively provide said lever as an extension of the pedal lever, a hand grip formed on the other end of said test instrument lever;
   a force indicating means mounted upon said test instrument lever and engaging said pedal intermediate said yoke and said hand grip, whereby application of force to said hand grip in a brake actuating direction causes arcuate movement of said pedal and said pedal lever, the magnitude of force applied to said pedal being indicated by said force indicating means;
   and an angular displacement measurement means mounted upon said test instrument lever and indicating the angular movement of said pedal, thereby indicating to the test operator that the pedal has been moved through the specified arc and that said force indicating means should be read.

2. The test instrument of claim 1, said force indicating means further including:
   a pressure cell mounted on said test instrument lever and engaging said pedal, whereupon application of force to said test instrument lever in a brake actuating direction fluid pressure is generated in said pressure cell in direct proportion to the force applied to said pedal;
   and a hydraulic pressure gauge mounted on said test instrument lever and in fluid communication with said pressure cell through appropriate conduit means, said pressure gauge calibrated to indicate the force applied to said pedal.

3. The test instrument of claim 1, said angular displacement measurement means further including:
   a housing having an arcuate guide member with a guide slot formed therein;
   first and second spirit level devices mounted at a fixed angle relative to each other and pivotally mounted on said housing;
   first and second axially extending guide rods mounted respectively on said first and second spirit level devices and extending through the guide slot of said housing;

friction detent means including first and second spring means respectively encircling said first and second guide rods and in concentric relationship therewith, said first and second spring means engaging respectively said first and second spirit level devices and acting against said arcuate guide member of said housing to hold said first and second spirit level devices stationary relative to said housing, said friction detent means being overcome by force applied to at least one of said first and second guide rods causing said first and second spirit level devices to rotate unitarily relative to said housing, said first spirit level being adjusted to a level horizontal position before braking force is applied to said test instrument lever;

whereupon application of brake actuating force to said test instrument lever, said first and second spirit level devices rotate unitarily therewith, said second spirit level device assuming a level horizontal position upon actuation of said pedal through the fixed angle between said first and second spirit level devices, thereby indicating to the test operator that the pedal has been moved through the specified arc and that said force indicating means should be read.